Feb. 13, 1940.      C. V. McGUIRE      2,189,813
COMPOSITE PNEUMATIC MATERIAL
Filed Feb. 12, 1936
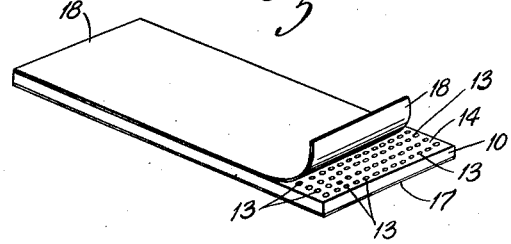
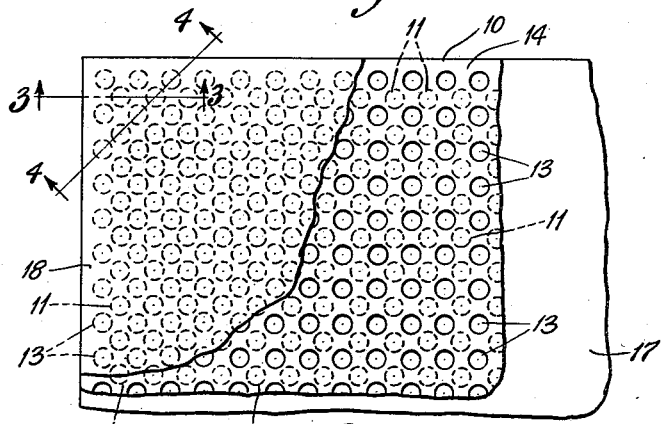
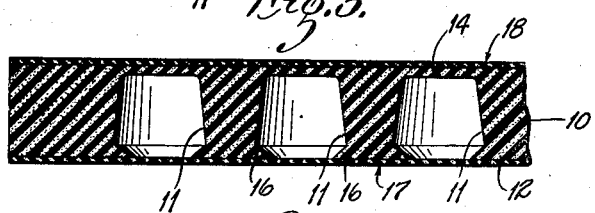
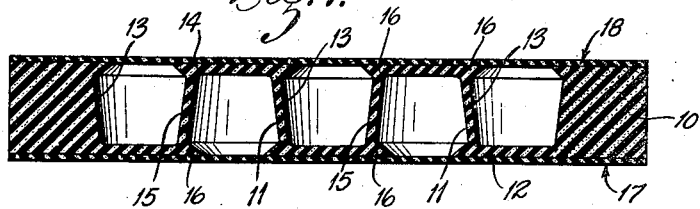
INVENTOR:
CLARENCE V. McGUIRE,
By Laurence LeRoy Kingsland
ATTORNEY.

Patented Feb. 13, 1940

2,189,813

UNITED STATES PATENT OFFICE 2,189,813

COMPOSITE PNEUMATIC MATERIAL

Clarence V. McGuire, Grosse Pointe, Mich., assignor to Airfilm Corporation, a corporation of Michigan Application February 12, 1936, Serial No. 63,487

8 Claims. (Cl. 154—48)

The present invention relates to a pneumatic material and to a method of making it. In particular it involves a rubber composite material of general utility, but especially adapted for shoe insoles.

It is an object of this invention to provide an unusually flexible material including sealed air pockets.

It is a further object to provide such a material wherein the sealed air pockets cover substantially the entire body of the material and are so shaped that a load supported on the material will be supported almost entirely on air.

A further object is to provide a material of this kind having a series of pockets therein opening into the surface of the material, and the openings of which are permanently sealed over by a sheet of flexible material.

A further object is to provide a convenient method of manufacturing the composite product, including an easy way of expanding the outer sealing sheet for application to the body material, and so that ultimately said sealing sheet will be under tension.

It is a further object of the invention to so design the material as to provide the maximum practical sealing surface on the base material onto which surface the flexible sheet may be adhesively united.

Other objects will appear in the specification which now follows.

In the drawing:

Fig. 1 is a perspective view of a sheet of the material with a portion of one of the sealing sheets or dams turned up to disclose the inner construction.

Fig. 2 is a segmental plan view of a portion of the composite material with the different layers thereof successively broken away to show the construction.

Fig. 3 is a section on the line 3—3 of Fig. 2.

Fig. 4 is a section on the line 4—4 of Fig. 2.

The present invention is an improvement on copending application 740,920 filed August 22, 1934, by the present applicant.

Prior to this invention, certain forms of pneumatic insole material for use in shoes had been made. These, however, have not proved satisfactory for various reasons.

If the material were composed of thin, flexible parts, it was liable to become permanently deformed under constant use, owing to its inherent lack of strength. If heavy material were used to overcome this disadvantage, it was so inflexible that it had little value as a pneumatic material.

Furthermore, in the use of thin material having sealed air cells, considerable seepage or leakage of air from individual cells occurred, owing to faulty sealing, etc., with the result that the cells collapsed after short usage and the material lost its value.

In the present invention, these disadvantages have been overcome and, as will be shown, they have been overcome by the peculiar design of the body material and the maintenance of the closure sheets under tension thereover.

Referring to the drawing, 10 indicates a section of body material having pockets 11 extending in from one surface 12 of said material and opening into said surface. Interspaced with the pockets 11 are pockets 13 extending from and opening with the opposite surface 14 of the said body material 10. It will be observed from Fig. 2 that these pockets are so interspaced that substantially the entire area of the body material is thus filled with pockets. It will be further observed from Fig. 4 that the walls 15 between adjacent pockets are not vertical but sloping so that they will have less resistance to a force applied vertically on the material 10.

It is further to be observed that the openings of the pockets 11 and 13 are formed with overhanging rims 16 for a purpose to be explained hereinafter.

Over the bottom surface of the body material 10 is located a sealing sheet or dam 17 adhesively united to the surface 12 thereof by a method to be disclosed. This sheet 17, after the composite material is completed, will be under tension. Similarly a sealing sheet or dam 18 is applied over the surface 14. The dams 17 and 18 enclose air in the pockets 11 and 13 and provide pneumatic air cells.

The rims or flanges 16 overhang their respective pockets and increase the surface area to which the dams 17 and 18 are applied without substantially reducing the volume of the pockets or decreasing the flexibility of the material. By thus increasing the area of adhesion, the possibility of separation of the dams from the body material is greatly reduced.

In order to apply the dams 17 and 18 in such wise that they will be under tension, a convenient method has been devised. In the first place, the dam sheets are selected to be initially substantially less extensive in area than the body material 10. They are then dipped in gasoline for a short period. The dams, being of rubber, when thus immersed, will expand, presumably by the absorption of gasoline. After they have been in the gasoline for a sufficient length of time, so that they will be expanded to the surface dimensions of the body material, they are removed therefrom and the surplus gasoline is shaken off. The body material 10 with a suitable cement thereon has previously been prepared and is ready—though it is obvious that, if desired, the cement may be applied to the dams instead of to the body material or may be applied to both. The expanded dams are then placed over the body material and by rolling or otherwise are forced against the surface of the said body material to which they are tightly bonded by the cement.

In a very short while, the gasoline absorbed by the dam evaporates, whence the dam seeks to return to its original shape or dimensions. As it is prevented from doing so by its being cemented to the body material 10, it will be held under tension and will remain thus. It will be observed that, at the time the cement is still plastic, very little tension is present in the dams. As the gasoline continues to evaporate, the tension increases, but simultaneously the cement becomes harder.

The advantages of having the dams under tension are several. In the first place, a better adherence of the dams to the body material is obtained, and there is less likelihood of entraining air bubbles between the dam and the adhesion surface of the body material. It is well known that such bubbles tend to spread and ultimately to destroy the union of the two materials. Furthermore, with the sealing dam under tension, when the top material 10 is deflected by application of a load thereto, as soon as the load is removed, the dam immediately seeks its original position and it will always restore the body material to its original shape, thus minimizing the tendency of the body material to assume a permanent deformation because of fatigue. It may be seen that the dam, in this action, causes the load, although applied to a particular locality, to be distributed, to some extent, over a much larger area of the body material. Furthermore, even should a certain amount of permanent deformation occur, there will always be some remaining tension in the dams sufficient at least to partially preserve the advantages above set forth.

Preferably the dams are made of light material, since more flexibility results, and also better adherence is obtained by having at least one of the two materials being united of flexible characteristics so as to follow the deformations of the other during the cementing operation. This adds to the advantages of having the dams initially under tension since, being light, they have greater tendency to stretch under the air pressure within the cells when compression load is applied. If they are originally under tension, permanent deformation to such an extent that they bulge from the surface of the material is less likely to result.

In connection with the application of the dams, an additional important result obtains from having the dams under tension. Necessarily, a certain amount of pressure is applied in cementing the dam to the body material. This pressure causes at least some of the cells to be collapsed, particularly where the sheets are passed between rollers. This collapsing of the cells may be regular or irregular, according to the process employed, but in any case, it deforms the cementing surface of the material.

Some of the cells thus collapsed do not of their own accord return to original shape. If this condition were not remedied, the resulting material would be valueless. However, by the present method, these collapsed cells are returned to shape. The tension occurring in the dam as it dries causes the dam to draw out these collapsed cells to their original shape, since the tendency of the sheet, being under tension, is to become planar.

Furthermore, this deformation of the cells, as noted, causes deformation of the cementing surface of the body material about the cell outlets. If the dam is not under tension, this deformation will cause wrinkles and puckers in the dam when the cell returns to round. As the present material dries, the tension occurs, and this tension removes any such wrinkles or puckers.

Among further advantages of the method herein described, for applying the dams to the body material, is the more uniform expansion equally distributed throughout the sheet. Consequently, when the final contraction takes place, this also will be uniform and the tension of the sheet resulting will be substantially uniform over the surface thereof. In other words, each air pocket will be covered by a tension seal, the tension of which is equal to that of all the other seals in the remaining pockets. The great difficulties that are encountered in attempting to apply a sheet of this kind to the body material by mechanical stretching, are apparent. In the present process the dam sheet is brought uniformly within close limits of the exact size of the body material, with consequent reduction of loss of material. Also, after the initial press operation, it is unnecessary to hold the dam until the cement sets, since, as heretofore noted, the contraction of the dam will occur more or less in proportion to the hardening of the cement. Furthermore, the present method is extremely simple and easy to perform.

In order to give an idea of what dimensions of material may be used, although clearly the invention is not limited to specific sizes, the body material may be in sheets about twenty-two inches square and approximately ¼" thick. The dam before expansion may be about eighteen inches square, and it has been found suitable to use rubber of about the thickness of dentist's dam.

It will be understood that suitable portions of the material are cut out to form insoles, where it is to be thus used.

The invention having been described, what is claimed is:

1. A composite pneumatic material including a resilient elastic body element having air pockets extending from one surface thereinto, and a sheet of elastic material united to the surface of said body element sealing said pockets, said sheet being under tension relative to the body portion when in the united state.

2. A composite pneumatic material including a resilient elastic body element having a multiplicity of air pockets extending in from one surface thereof, a sheet of light resilient elastic material adhesively united to the surface of said body element sealing said pockets, the sheet when thus united being under tension that is substantially uniform across the air pockets.

3. In a composite pneumatic material a flexible elastic body element having at least one air pocket extending from one surface thereof and opening into said surface, and a flexible elastic dam spanning the opening, said dam being sealed to the body element around said opening, the part of said dam that spans the air pocket being under tension.

4. A composite material including a flexible elastic body element having a multiplicity of air pockets extending inwardly from one surface thereof, and having a multiplicity of additional air pockets extending inwardly from the opposite surface thereof, said last named pockets being interspaced with said first named pockets so that substantially the entire element is made up of air pockets, and flexible elastic sealing dams, one over each surface of said element, and united thereto to enclose said air pockets to form air cells, said dams being normally under tension.

5. A composite material including a flexible elastic body element having air pockets extending in from one surface thereof, the walls of said pockets adjacent said surface being inwardly extended to form flanges to increase the surface of said element, and a flexible elastic sealing dam united to said element, said dam spanning said pockets and forming pneumatic cells.

6. A shoe insole material including a flexible elastic body element having a plurality of pockets extending inwardly from a side thereof, the element being of a thickness to fit within a shoe, and a sealing dam of flexible elastic material united to said body element and sealing said pockets.

7. A composite material including a flexible elastic body portion, interspaced air pockets extending into said body portion from opposite surfaces and having common walls, said walls being at an obtuse angle to the surfaces of the body portion, and a flexible elastic sealing element over each surface closing the air pockets.

8. A composite material including a flexible elastic body portion, interspaced air pockets extending into said body portion from the opposite surfaces and having common walls, said walls being at an obtuse angle to the surfaces of the body portion, and a flexible elastic sealing element over each surface closing the air pockets, said sealing elements being normally under tension relative to the body portion.

CLARENCE V. McGUIRE.